US010725878B2

(12) United States Patent
Nagao et al.

(10) Patent No.: US 10,725,878 B2
(45) Date of Patent: Jul. 28, 2020

(54) STORAGE APPARATUS, STORAGE SYSTEM, AND CONTROL METHOD OF STORAGE SYSTEM FOR DYNAMICALLY SECURING FREE SPACE WHEN A STORAGE APPARATUS IS DISUSED

(71) Applicant: HITACHI, LTD., Tokyo (JP)

(72) Inventors: Takashi Nagao, Tokyo (JP); Sadahiro Sugimoto, Tokyo (JP); Tomohiro Kawaguchi, Tokyo (JP); Norio Simozono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 256 days.

(21) Appl. No.: 15/749,014

(22) PCT Filed: Jul. 31, 2015

(86) PCT No.: PCT/JP2015/071736
§ 371 (c)(1),
(2) Date: Jan. 30, 2018

(87) PCT Pub. No.: WO2017/022002
PCT Pub. Date: Feb. 9, 2017

(65) Prior Publication Data
US 2018/0322024 A1 Nov. 8, 2018

(51) Int. Cl.
*G06F 11/20* (2006.01)
*G06F 12/084* (2016.01)
(Continued)

(52) U.S. Cl.
CPC .......... *G06F 11/2094* (2013.01); *G06F 3/061* (2013.01); *G06F 3/0604* (2013.01);
(Continued)

(58) Field of Classification Search
CPC ............ G06F 11/2056; G06F 11/2069; G06F 11/2089; G06F 11/2092; G06F 11/2094;
(Continued)

(56) References Cited

U.S. PATENT DOCUMENTS

| 7,096,317 B2 * | 8/2006 | Inoue .................. G06F 11/1666 |
|---|---|---|
| | | 711/112 |
| 2003/0167375 A1 * | 9/2003 | Morishita ............. G06F 3/0604 |
| | | 711/112 |

(Continued)

FOREIGN PATENT DOCUMENTS

| JP | 2005-285058 A | 10/2005 |
| JP | 2006-221526 A | 8/2006 |
| JP | 2015-517697 A | 6/2015 |

OTHER PUBLICATIONS

International Search Report WO 2017/022002 A1, dated Oct. 27, 2015.

*Primary Examiner* — Joseph O Schell
(74) *Attorney, Agent, or Firm* — Volpe and Koenig, P.C.

(57) ABSTRACT

A storage system capable of dynamically securing free space when a certain storage apparatus is disused and reducing the influence on the system upon dynamically securing the free space without having to continuously secure, in a memory of another storage apparatus, free space capable of storing management information of the corresponding storage apparatus in preparation of a case where such storage apparatus is disused. Each storage apparatus comprises a memory including a management information storage area for storing management information and a cache area for storing cache information, and a processor which manages a status of the cache area. At least certain processors determine a storage apparatus to become a copy destination of the copy target management information. The storage apparatus of the copy destination releases at least a part of the cache area and (Continued)

stores the management information in the released cache area.

15 Claims, 8 Drawing Sheets

(51) Int. Cl.
  *G06F 3/06* (2006.01)
  *G06F 11/16* (2006.01)
  *G06F 12/0871* (2016.01)
(52) U.S. Cl.
  CPC ............ *G06F 3/065* (2013.01); *G06F 3/0614* (2013.01); *G06F 3/0665* (2013.01); *G06F 3/0683* (2013.01); *G06F 11/1662* (2013.01); *G06F 12/084* (2013.01); *G06F 12/0871* (2013.01); *G06F 3/0646* (2013.01); *G06F 2212/1024* (2013.01)
(58) Field of Classification Search
  CPC .... G06F 3/0604; G06F 3/0614; G06F 3/0646; G06F 3/065; G06F 3/0652; G06F 3/0683; G06F 3/0685; G06F 3/0688; G06F 12/0866; G06F 12/0868; G06F 12/0871; H04L 67/2842
  See application file for complete search history.

(56) References Cited

U.S. PATENT DOCUMENTS

| | | | |
|---|---|---|---|
| 2004/0153727 A1* | 8/2004 | Hicken | G06F 11/1658 714/6.12 |
| 2005/0132136 A1* | 6/2005 | Inoue | G06F 11/1666 711/114 |
| 2005/0223174 A1 | 10/2005 | Mogi et al. | |
| 2006/0143407 A1* | 6/2006 | Humlicek | G06F 12/0804 711/143 |
| 2006/0184760 A1 | 8/2006 | Fujibayashi et al. | |
| 2006/0218350 A1 | 9/2006 | Mogi et al. | |
| 2007/0245088 A1 | 10/2007 | Mogi et al. | |
| 2009/0271539 A1 | 10/2009 | Fujibayashi et al. | |
| 2013/0318196 A1 | 11/2013 | Yamamoto et al. | |
| 2015/0312337 A1* | 10/2015 | Keremane | H04L 67/1095 709/217 |
| 2016/0162422 A1* | 6/2016 | Weber | G06F 13/28 710/308 |

* cited by examiner

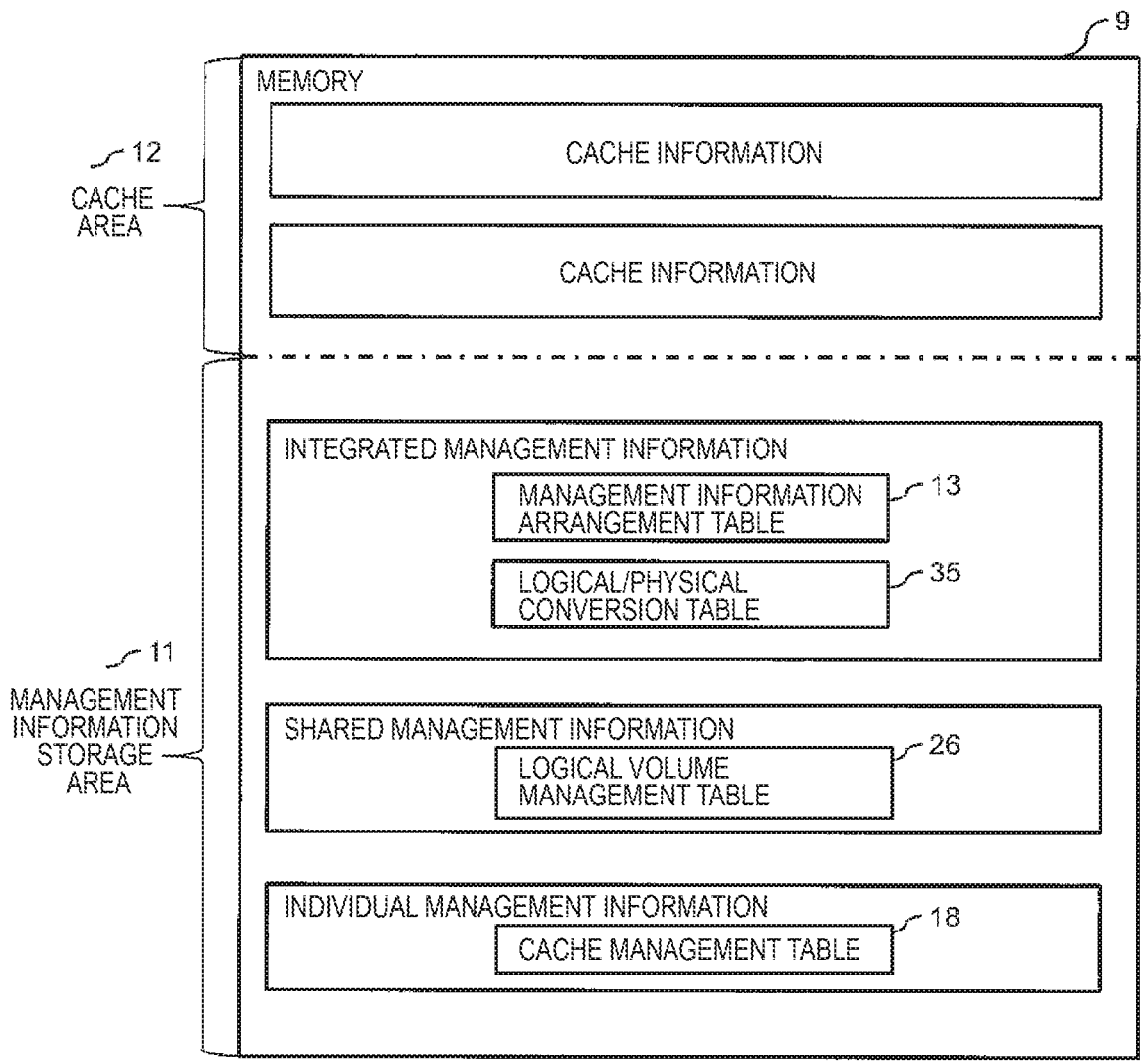

FIG.5

CACHE MANAGEMENT TABLE 18

| CACHE ID 180 | PHYSICAL MEMORY ID 181 | PHYSICAL ADDRESS 182 | BUSY FLAG 183 | USE START TIME 184 | LAST ACCESS TIME 185 | DIRTY DATA FLAG 186 | CACHE HIT COUNT 187 |
|---|---|---|---|---|---|---|---|
| 1 | 1 | 0x0000 | ON | 10:00:00 | 12:00:00 | ON | 40 |
| 2 | 1 | 0x4000 | OFF | 00:00:00 | 00:00:00 | OFF | 0 |
| 3 | 2 | 0x2000 | ON | 09:59:59 | 10:00:00 | OFF | 70 |

FIG.6

LOGICAL VOLUME MANAGEMENT TABLE 26

| LOGICAL VOLUME ID 260 | CACHE GUARANTEE 261 | LOGICAL VOLUME ADDRESS 262 | CACHE ID (A) 263 | CACHE ID (B) 264 | DRIVE ID 265 | DRIVE ADDRESS 266 |
|---|---|---|---|---|---|---|
| 1 | 500MB | 0x0000 | 1 | 7 | 1 | 0x2000 |
| 1 | 500MB | 0x1000 | 3 | NONE | 5 | 0x2000 |
| 2 | 100MB | 0x0000 | NONE | NONE | 3 | 0x3000 |

FIG.7

LOGICAL/PHYSICAL CONVERSION TABLE 35

| LOGICAL MEMORY ID 350 | LOGICAL ADDRESS 351 | STORAGE ID 352 | PHYSICAL MEMORY ID 353 | PHYSICAL ADDRESS 354 |
|---|---|---|---|---|
| 1 | 0x1000 | 1 | 3 | 0x5000 |
| 1 | 0x2000 | 2 | 4 | 0x5000 |
| 2 | 0x8000 | 3 | 2 | 0x8000 |

STORAGE APPARATUS, STORAGE SYSTEM, AND CONTROL METHOD OF STORAGE SYSTEM FOR DYNAMICALLY SECURING FREE SPACE WHEN A STORAGE APPARATUS IS DISUSED

TECHNICAL FIELD

The present invention relates to a storage apparatus, a storage system, and a control method of a storage system.

BACKGROUND ART

As the background art of this technical filed, there is the technology described in Japanese Patent Application Publication No. 2006-221526 (PTL 1). This publication describes a technology related to a storage apparatus comprising a plurality of memories, wherein management information is made redundant between different memories and, when a failure occurs in a memory storing the management information, the management information is copied to another memory to ensure redundancy.

CITATION LIST

Patent Literature

PTL 1: Japanese Patent Application Publication No. 2006-221526

SUMMARY OF THE INVENTION

Problems to be Solved by the Invention

In connection with a storage system which stores business data required for companies and the like to carry out their business, there are demands for building a system by coordinating a plurality of storage apparatuses in order to flexibly change the system size in accordance with changes in the business circumstances. For example, by building a system with storage apparatuses comprising the storage resources initially required upon introducing the system, and subsequently adding new storage apparatuses while utilizing the existing storage apparatuses when the business grows and the usage of storage resources increases, the storage resources of the overall system can be expanded.

When building a storage system with a plurality of storage apparatuses as described above, the availability of the storage system can be improved by making redundant the management information required for operating the storage system between memories of different storage apparatuses. Moreover, if a failure occurs in a certain storage apparatus configuring the storage system or if a certain storage apparatus configuring the storage system is to be removed and that storage apparatus is disused, the redundancy can be maintained by copying the management information stored in that storage apparatus to another storage apparatus.

In PTL 1, it is necessary to secure free space capable of storing management information in the memory of the copy destination in order to copy the management information upon the occurrence of a failure. Nevertheless, when free space capable of storing management information is continuously secured in the storage apparatus of the copy destination, the usage rate of the memory in normal times will deteriorate, and costs will increase. Meanwhile, when free space capable of storing management information is dynamically secured in the storage apparatus of the copy destination, while the usage rate of the memory in normal times will improve, it is necessary to reduce the influence on the system upon dynamically securing the free space. Thus, it is important to appropriately decide the storage apparatus of the copy destination in light of the usage status of the memory that is managed individually in each storage apparatus.

Thus, an object of this invention is to provide a storage system capable of dynamically securing free space when a certain storage apparatus is disused and reducing the influence on the system upon dynamically securing the free space without having to continuously secure, in a memory of another storage apparatus, free space capable of storing management information of the corresponding storage apparatus in preparation of a case where such storage apparatus is disused.

Means to Solve the Problems

In order to achieve the foregoing object, the storage system of the present invention comprises a plurality of storage apparatuses including a first storage apparatus. Each of the plurality of storage apparatuses comprises a memory which includes a management information storage area for storing management information and a cache area for storing cache information, and a processor which manages a status of the cache area. When a memory of the first storage apparatus is to be disused, at least certain processors of the plurality of storage apparatuses determine a copy destination storage apparatus to become a copy destination of the copy target management information, which is the management information stored in the memory to be disused, based on the status of the cache area that is managed by each of the storage apparatuses other than the first storage apparatus. The processor of the copy destination storage apparatus releases at least a part of the cache area of the memory of the copy destination storage apparatus, and stores the copy target management information in the released cache area.

Advantageous Effects of the Invention

The present invention is able to improve the usage efficiency of the memory by dynamically securing free space when a certain storage apparatus is disused upon dynamically securing the free space without having to continuously secure, in a memory of another storage apparatus, free space capable of storing management information of the corresponding storage apparatus in preparation of a case where such storage apparatus is disused. The present invention is also able to reduce the influence on the storage system upon dynamically securing the free space. Other objects, configurations and effects of the present invention will become more apparent based on the detailed description of the embodiments.

BRIEF DESCRIPTION OF DRAWINGS

FIG. 3 is a diagram showing a configuration of the memory.

FIG. 4 is a diagram showing a configuration of the management information arrangement table.

FIG. 5 is a diagram showing a configuration of the cache management table.

FIG. 6 is a diagram showing a configuration of the logical volume management table.

FIG. 7 is a diagram showing a configuration of the logical/physical conversion table.

DESCRIPTION OF EMBODIMENTS

An embodiment of the present invention is now explained with reference to the appended drawings.

Figure 1:
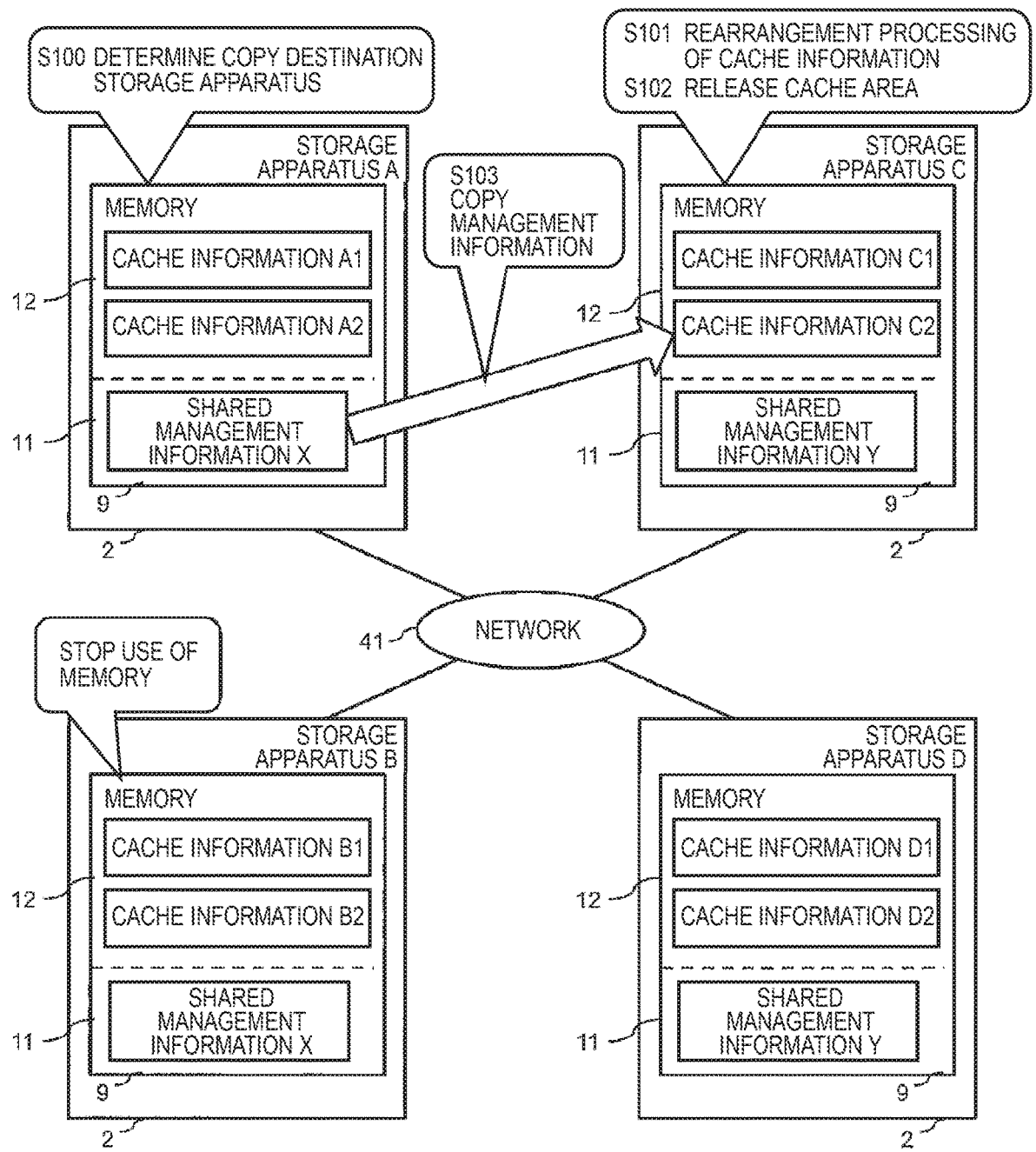
FIG. 1 is a diagram showing a concept of the save processing of the management information.

FIG. 1 is a diagram showing a concept of the save processing of the management information in this embodiment.

With the storage system of this embodiment, a plurality of storage apparatuses 2 are connected via a network 41. A memory 9 of each storage apparatus 2 includes a management information storage area 11 for storing management information, and a cache area 12 for storing cache information. Moreover, a processor 8 of each storage apparatus 2 manages the access frequency of the cache area 12 of the corresponding storage apparatus 2.

The management information is information which is stored in at least one of the memories 9 of the plurality of storage apparatuses 2 and which can be referenced by at least one of the processors 8 of the plurality of storage apparatuses 2 from the memory 9 when the plurality of storage apparatuses 2 are operating. In particular, when the respective storage apparatuses 2 are operating, the processor 8 of the corresponding storage apparatus 2 can refer to the management information stored in the memory 9 of the corresponding storage apparatus 2.

The cache information is information which can be deleted from any one of the memories 9 of the plurality of storage apparatuses 2 when the same data is stored in a storage device (drive 4) equipped in at least one of the plurality of storage apparatuses 2. In particular, when the respective storage apparatuses 2 are operating, the cache information, which is the same data as the data stored in the storage device (drive 4) of the corresponding storage apparatus 2, may be deleted from the cache area 12 of the memory 9. Here, the term "delete (deletion)" may mean any one among overwriting the corresponding cache information with other cache information, erasing the corresponding cache information, or disabling access to the corresponding cache information.

In FIG. 1, storage apparatuses A, B, C, D are illustrated as examples of the plurality of storage apparatuses 2. However, the number of storage apparatuses 2 to configure the storage system is not limited to this example, and any number of storage apparatuses 2 may be used so as long as there are at least two or more storage apparatuses 2.

The management information storage area 11 of the memory 9 of the storage apparatus A and the management information storage area 11 of the memory 9 of the storage apparatus B respectively store the same shared management information X, thereby making redundant the shared management information X. By making the management information redundant between different storage apparatuses 2 as described above, even if one storage apparatus 2 is subject to a failure and the memory 9 becomes unusable, the management information stored in the memory 9 of the other storage apparatus 2 can be used to continue operations, and the availability of the storage system can thereby be improved.

An example of the management information save processing to be executed in the storage system in the case of disusing the memory 9 of the storage apparatus B is now explained. When the memory 9 of the storage apparatus B is disused, the redundancy of the shared management information X will be lost, and the reliability will deteriorate. Thus, based on this processing, the shared management information X is copied to at least either the storage apparatus C or the storage apparatus D, other than the storage apparatuses A, B, to make redundant the shared management information X, and restore the reliability. Here, a case of disusing the memory 9 of the storage apparatus 2 is typically a case of disusing the storage apparatus 2, and, for instance, this would correspond to cases where the storage apparatus 2 is subject to a failure or the storage apparatus 2 is to be removed. For example, the operation/management cost can be reduced by removing certain storage apparatuses 2 from the plurality of storage apparatuses 2 configuring the storage system. The shared management information X stored in the memory 9 to be disused is also referred to as the "copy target management information".

When the memory 9 of the storage apparatus B is to be disused, for example, the storage apparatus A that is making redundant the shared management information X with the storage apparatus B detects the disuse of the memory 9 of the storage apparatus B. The foregoing disuse may be detected by the storage apparatus A periodically or randomly accessing the storage apparatus B, or detected based on an instruction from a management terminal connected to the storage system.

The storage apparatuses C, D other than the storage apparatuses A, B are the copy destination candidate storage apparatuses to become the copy destination candidates of the shared management information X. In the ensuing explanation, let it be assumed that all memories 9 of the copy destination candidate storage apparatuses are storing the management information (shared management information Y and the like) and the cache information (cache information C1, C2, D1, D2 and the like), and do not have any free space for storing the shared management information X. By refraining from continuously securing free space in the copy destination candidate storage apparatuses for storing the management information (shared management information X) of another storage apparatus 2, and rather securing a larger cache area 12, the usage efficiency of the memory 9 can be improved.

In this embodiment, information of one of the memories 9 of the copy destination candidate storage apparatuses is deleted to store the shared management information X. Because the management information is information required for the operation of the storage system and cannot be deleted, the cache information is deleted. The cache area 12 of the memory 9 of the storage apparatus 2 stores cache information (cache data) for accelerating the response performance when a data access request is sent from the host computer 1, and often does not have any capacity available for storing the management information that needs to be copied. The cache area 12 has both a cache area with a high access frequency and a cache area with a low access frequency. Thus, if cache information is randomly deleted to release the cache area, the cache hit ratio will decrease and the access performance will deteriorate considerably. In this embodiment, the access performance is deemed the cache hit ratio, and the deterioration in the access performance is explained as the deterioration in the cache hit ratio. However, the access performance and the deterioration in the access performance are not limited to this example.

Thus, at least a part of the cache area 12 is released based on the access frequency of the cache area 12 so that the deterioration in the cache hit ratio will decrease. Consequently, without having to secure unused memory capacity in advance, in cases where the storage apparatus 2 is subject to a failure or removed, the management information of that storage apparatus 2 can be stored in the memory 9 of another storage apparatus 2.

In the ensuing explanation, illustrated is a case of storing the shared management information X, which is one type of copy target management information, in one of the copy destination candidate storage apparatuses. Nevertheless, when there are a plurality of pieces of copy target management information and such copy target management information can be stored separately in different storage apparatuses 2, the following processing may also be executed for each piece of copy target management information. In the foregoing case, the copy destination storage apparatus may be decided preferentially from the copy target management information with the largest capacity.

Foremost, the storage apparatus A notifies the capacity of the shared management information X to each of the copy destination candidate storage apparatuses C, D. The copy destination candidate storage apparatuses C, D predict the deterioration in the access performance when the shared management information X is copied based on the access frequency of the cache area 12 managed individually by each of the copy destination candidate storage apparatuses C, D, and send the predicted deterioration to the storage apparatus A. The storage apparatus A determines, as the copy destination storage apparatus, the copy destination candidate storage apparatus in which the predicted deterioration in the access performance is low based on the deterioration predicted by each of the copy destination candidate storage apparatuses C, D (S100). It is thereby possible to reduce the influence on the access frequency of the overall system when the cache area is released. In the example shown in FIG. 1, the copy destination storage apparatus is the storage apparatus C. Details of the access performance deterioration prediction processing performed by each of the copy destination candidate storage apparatuses C, D will be described later with reference to FIG. 10.

Here, while the copy destination storage apparatus was explained as the copy destination candidate storage apparatus in which the deterioration in the access performance is low, the determination does not necessary need to be made only based on the deterioration in the access performance. For example, when there are storage apparatuses 2 in which the copy target management information is preferentially stored among the plurality of copy destination candidate storage apparatuses, the copy destination storage apparatus may also be determined based on such priority. In the foregoing case, necessary information may also be acquired from each of the copy destination candidate storage apparatuses. For example, because the access performance may deteriorate when the storage apparatus 2, in which its processor 8 is of a high load, performs the copy processing, the load of the processor 8 of each storage apparatus 2 may be acquired, and the storage apparatus 2 in which the load of the processor 8 is low may be determined to be the copy destination storage apparatus.

The copy destination storage apparatus may be determined based on the status of the cache area 12 managed by each of the copy destination candidate storage apparatuses. The status of the cache area 12 may include information of the access frequency of the cache area 12. The status of the cache area 12 may also include a last access time 185 of the cache area 12, information on whether or not the cache area 12 can be used, and information (busy flag 183) regarding whether the cache area 12 is being used.

The storage apparatus A instructs the copy destination storage apparatus C to secure a capacity for copying the shared management information X. The processor of the copy destination storage apparatus C rearranges the cache information (C1, C2 and the like) of the copy destination storage apparatus C based on the access frequency so that the cache area storing the shared management information X becomes a continuous area (S101). Details of this cache information rearrangement processing (S101) will be described later with reference to FIG. 11.

The copy destination storage apparatus C secures free space for storing the shared management information X by releasing at least a part of the cache area 12 of the memory 9 of the copy destination storage apparatus C (S102). The copy destination storage apparatus C copies the shared management information X from the storage apparatus A and stores the copied shared management information X in the released cache area 12 (S103). Accordingly, the shared management information X is made redundant between the memory 9 of the storage apparatus A and the memory 9 of the copy destination storage apparatus C.

The copy destination storage apparatus C notifies the storage destination of the shared management information X to at least some or all of the plurality of storage apparatuses 2. For example, the copy destination storage apparatus C notifies the storage destination of the shared management information X to the storage apparatus A and the storage apparatus D. Because the storage destination of the shared management information X is notified to the other storage apparatuses 2 as described above, the notified storage apparatus 2 can access the shared management information X stored in the copy destination storage apparatus C.

It is possible to dynamically secure free space upon disusing a storage apparatus 2 and improve the usage efficiency of the memory 9 without having to continuously secure, in the memory 9 of another storage apparatus 2, free space capable of storing copy target management information of the corresponding storage apparatus 2 in preparation of a case where such storage apparatus 2 is disused. It is also possible to reduce the influence on the storage system upon dynamically securing the free space.

Figure 2:
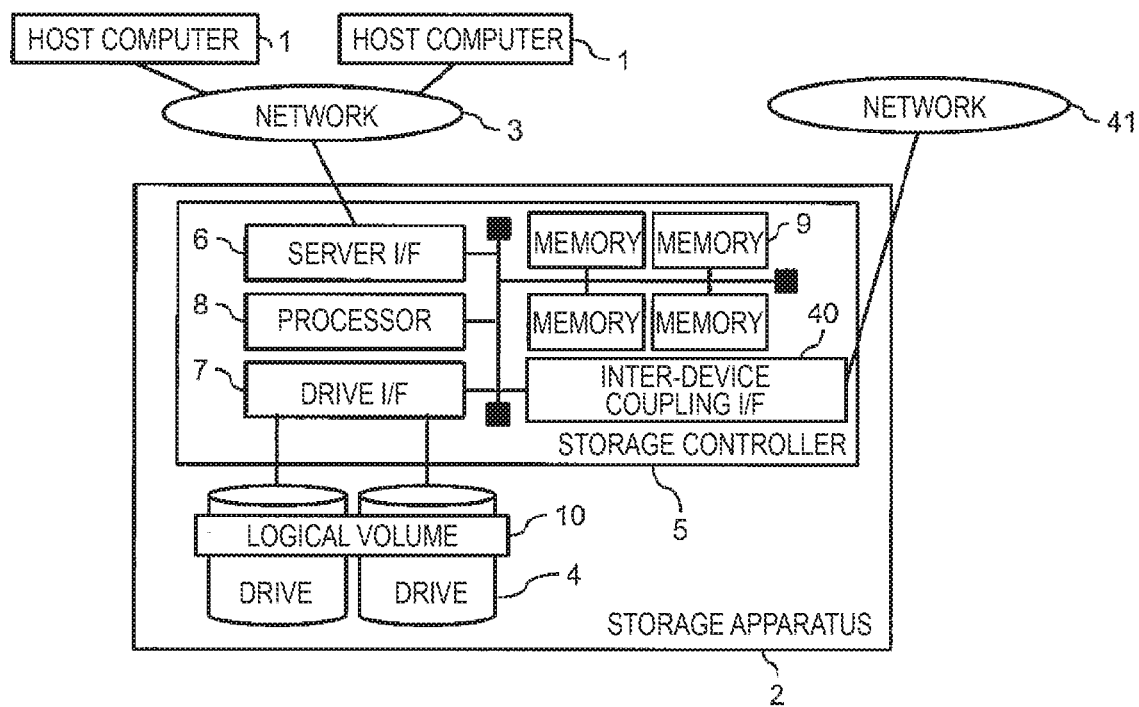
FIG. 2 is a diagram showing a configuration of the storage apparatus.

FIG. 2 is a diagram showing a configuration of the storage apparatus 2.

The storage apparatus 2 includes a drive 4 as a data storage device, and a storage controller 5 which executes processing according to a command. The drive 4 is a non-volatile storage device. The drive 4 may be, for example, a semiconductor memory device such as a magnetic disk or an SSD (Solid State Drive). One or more drives 4 and storage controllers 5 may be provided.

The storage controller 5 includes a server I/F (interface) 6, a drive I/F 7, an inter-device coupling I/F 40, a processor 8, and a memory 9, and these components are mutually connected via an internal network. The server I/F 6 is connected to a host computer 1 via a network 3, and executes transmission/reception processing of commands and data to and from the host computer 1. The drive I/F 7 executes transmission/reception processing of commands and data to and from the drive 4. The inter-device coupling I/F 40 is connected to other storage apparatuses 2 via a network 41, and executes transmission/reception processing of commands and data to and from the other storage apparatuses 2. One or more memories 9 may be provided in one storage controller 5. The network 3 and the network 41 are communication channels for exchanging commands and data with the devices (host computer 1 and storage apparatus 2) connected thereto, and are, for example, a SAN (Storage Area Network).

The network 3 and the network 41 may be the same network, or mutually independent networks. Note that, when the network 3 and the network 41 are mutually independent networks, there is an advantage in that the communication performed between the plurality of storage apparatuses 2 via the network 41 will not affect the communication performed between the host computer 1 and the storage apparatuses 2 via the network 3.

The processor 8 executes the programs in the memory 9 and performs various types of processing according to the command. The processor 8 may be an arithmetic unit or a control unit which executes programs. In the ensuing explanation, the processing that is performed by the processor 8 executing the programs in the memory 9 may be described as being performed by the storage apparatus 2 or the storage controller 5.

The memory 9 is a volatile storage device. The memory 9 may be a storage unit which stores data. The plurality of storage apparatuses 2 are linked, and mutually share the memories 9. The memories 9 shared by the plurality of storage apparatuses 2 are assigned a logical memory ID as a unique identifier among the plurality of storage apparatuses 2, and a physical memory ID as a unique identifier within the storage apparatus 2 which includes the corresponding memory 9.

The logical volume 10 is configured from physical storage areas of a plurality of drives 5 by the storage controller 5. The configuration example is, for example, RAID (Redundant Arrays of Inexpensive Disks), and, by using a plurality of drives 4, improved reliability based on data redundancy and improved performance based on the parallel operation of the drives 4 can be expected. The storage controller 5 provides the logical volume 10 to the host computer 1. The storage apparatus 2 includes one or more logical volumes 10.

The host computer 1 may be a physical computer including a processor and a memory, or a virtual computer that runs on a physical computer. The host computer 1 is also referred to as a server. The host computer 1 is, for example, a workstation that provides an online mail order service. The host computer 1 stores, in the storage apparatus 2, at least a part of the data required for the service provided by the host computer 1. The host computer 1 reads and writes data stored in the storage apparatus 2 by sending a data access request to the storage apparatus 2. As the data access request, for example, used is a read command or a write command that is compliant with the SCSI (Small Computer System Interface) standard. The data access request is also referred to as an I/O (Input/Output) request.

FIG. 3 is a diagram showing a configuration of the memory 9. The processor 8 manages the storage area of the memory 9 by dividing it into a management information storage area 11 and a cache area 12 by using a management information arrangement table 13 and a cache management table 18 described later.

Management information is stored in the management information storage area 11. As the types of management information, there are integrated management information, shared management information, and individual management information. Management information may also be referred to as configuration information or control information depending on the contents of the management information.

The integrated management information is information which is provided in each of the plurality of storage apparatuses 2 configuring the storage system. As examples of the integrated management information, there are a management information arrangement table 13, and a logical/physical conversion table 35.

The shared management information is management information that can be referenced not only from the host storage apparatus 2, but also from other storage apparatuses 2. In the ensuing explanation, the shared management information will be mainly explained as the management information which is made redundant between certain different storage apparatuses 2 among the plurality of storage apparatuses 2 configuring the storage system. However, depending on the shared management information, the shared management information may also be made redundant between different memories 9 within the same storage apparatus 2.

The location (address) of the shared management information is managed with the management information arrangement table 13, which is integrated management information. Thus, the shared management information stored in the memory 9 of a certain storage apparatus 2 can be shared with the other storage apparatuses 2. The shared management information includes at least one of either a program to be executed by one of the processors of the plurality of storage apparatuses 2, or management information to be used in executing one of the programs. As an example of a program to be executed by the processor 8, there is a backup function program which realizes a data backup function. As examples of management information to be used in executing a program, there are backup function control information to be used in executing the backup function program, a logical volume management table 26, security setting information, billing information and so on.

The individual management information is management information to be individually managed by each storage apparatus 2. As an example of the individual management information, there is a cache management table 18 including information of the access frequency of the cache area 12 of the corresponding storage apparatus 2. Contents of the individual management information may differ between different storage apparatuses 2. For example, because the cache management table 18 of each storage apparatus 2 is the management information managing the access frequency of the cache area 12 of the corresponding storage apparatus 2, contents of the cache management table 18 will differ between different storage apparatuses 2. Moreover, the cache management table 18 is information in which the contents thereof are changed suitably depending on the data access request of the host computer 1. When the cache management table 18 is made redundant between different storage apparatuses 2, because synchronization is required each time the contents thereof are changed, the load of the storage system will increase, and the access response performance may deteriorate. Because the cache management table 18 is normally information that is used within the corresponding storage apparatus 2, the cache management table 18 does not need to be made redundant between different storage apparatuses 2.

Accordingly, the storage apparatus 2 to access the management information will differ depending on the usage and contents of the management information. Management information that is accessed by a plurality of storage apparatuses 2 needs to be made redundant between storage apparatuses 2, and the amount of management information to be copied may be reduced by limiting the copy target management information to the foregoing management information. For example, the copy target management information may be limited to be the shared management information.

Moreover, input/output data based on a data access request from the host computer 1 is temporarily stored in the cache area 12. Data stored in the cache area 12 is referred to as "cache information". As the cache information, there are write data and read data. The cache information is information for improving the performance (speeding up) of access to data in a drive 4 that has a lower performance (that is slower) than the memory 9. In other words, the cache information of each storage apparatus 2 includes at least one of either write data based on a write request from the host computer 1 connected to the storage apparatus 2 or read data for use in response to a read request from the host computer 1.

For example, when a storage apparatus 2 receives a write request from the host computer 1, the storage apparatus 2 once stores the write data pertaining to the write request in the memory 9, and returns a write completion response to the host computer 1. Because the storage apparatus 2 is able to asynchronously perform the write processing of the write data from the memory 9 to a low performance drive 4 (this processing is hereinafter also referred to as the "destage processing"), the storage apparatus 2 can return a write completion response in a short time in response to the write request from the host computer 1.

Moreover, for example, when data pertaining to a read request is stored in the memory 9 when the storage apparatus 2 received the read request from the host computer 1, the storage apparatus 2 acquires the corresponding data from the memory 9, and sends a reply to the host computer 1. When the data pertaining to the read request is not stored in the memory 9, the storage apparatus 2 acquires the corresponding data from the drive 4 and stores the acquired data in the memory 9, and then sends a reply to the host computer 1. The data pertaining to the read request is referred to as "read data". When the read data is stored in the cache area 12 of the memory 9, the storage apparatus 2 is not required to read the read data from the drive 4, which is of a lower performance than the memory 9, and can send a reply in a short time in response to the read request from the host computer 1.

In order to prevent the loss of individual management information and cache information in the event the memory 9 is subject to a failure, each storage apparatus 2 copies and duplicates the individual management information and the cache information between different memories 9 of the same storage apparatus 2 to achieve redundancy. However, with regard to the read data, even if the read data stored in the cache of the memory 9 is lost, because the read data can be read from the drive 4 and a reply can then be sent to the host computer 1, the read data does not need to be duplicated between a plurality of memories 9. With regard to the write data, the redundancy may be continued or restored as described later, or the redundancy may be avoided by executing the destage processing. Moreover, when the storage apparatus 2 comprises a plurality of storage controllers 5 including a memory 9, the individual management information and the cache information may also be made redundant by being stored in the memories 9 of different storage controllers 5 within the corresponding storage apparatus 2.

Moreover, when the memory 9 is disused, such as when the memory 9 is subject to a failure, each storage apparatus 2 may copy the management information stored in the memory 9 to be disused to a different memory 9 within the same storage apparatus 2 to restore the redundancy. The management information (copy target management information) in the foregoing case may include at least one among individual management information, shared management information, and integrated management information.

Here, the corresponding storage apparatus 2 determines the cache information to be deleted based on the access performance deterioration prediction processing (FIG. 10) performed with regard to the plurality of memories 9 in the host storage apparatus 2. It is thereby possible to reduce the influence on the access frequency of the corresponding storage apparatus 2 upon releasing the cache area 12. Furthermore, in order to store the copy target management information, the corresponding storage apparatus 2 executes the cache information rearrangement processing (S101, FIG. 11) based on the access frequency so that the released cache area 12 will be a continuous area. Here, upon selecting the cache area 12 to be released, the selection may be made based on a predetermined policy or priority. For example, the memory 9 including the cache area 12 to be released may be properly selected based on a policy of making redundant the management information by using the memories 9 between different storage controllers 5 within the corresponding storage apparatus 2, or a policy of making redundant the management information between different memories 9 within the corresponding storage apparatus 2. The corresponding storage apparatus 2 secures free space for storing the copy target management information by releasing at least a part of the cache area 12 of the memory 9 of the corresponding storage apparatus 2. The corresponding storage apparatus 2 copies the copy target management information from the memory 9 storing the copy target management information, and stores the copied copy target management information in the released cache area 12 to restore the redundancy.

FIG. 4 is a diagram showing a configuration of the management information arrangement table 13. The storage apparatus 2 uses the management information arrangement table 13 and manages the management information storage area 11 of the memory 9 storing the shared management information. The management information arrangement table 13 is management information which associates a management information name 130, a logical memory ID(A) 131, a logical address (A) 132, a logical memory ID(B) 133, a logical address (B) 134, and a size 135. FIG. 4 shows that, as the storage area of the memory 9 storing the management information that is identified by the management information name 130, an area of the size 135 has been secured from the logical address (A) 132 of the memory 9 that is identified by the logical memory ID(A) 131, and an area of the size 135 has been secured from the logical address (A) 134 of the memory 9 that is identified by the logical memory ID(B) 133.

For example, according to the example shown in FIG. 4, in the entry in which the management information name 130 is "security setting information", as the storage area of the storage destination of the management information referred to as "security setting information", a storage area having a size of 0x1000 has been secured respectively from the logical address 0x1000 of the logical memory ID 1 and from the logical address 0x1000 of the logical memory ID 2.

With regard to each piece of management information, so that the management information will not be lost even when one of the memories 9 of the storage destination becomes unusable, different IDs are set to the logical memory ID(A) 131 and the logical memory ID(B) 133 that the physical memories 9 will be different.

Note that, in this embodiment, because the logical volume management table 26 is shared management information as described above, the logical volume management table 26 is managed by the management information arrangement table 13, but it is not illustrated in FIG. 4. Each storage apparatus 2 creates a logical volume management table 26 with regard to the logical volume 10 of the host storage apparatus 2. Accordingly, the logical volume management table 26 of each storage apparatus 2 may also be managed by the management information arrangement table 13.

FIG. 5 is a diagram showing a configuration of the cache management table 18. The processor 8 of the storage apparatus 2 uses the cache management table 14 and manages the status of the cache area 12 of the memory 9 storing the cache information. In the cache area 12, the stored cache information changes dynamically according to the data access of the host computer 1. Thus, the small areas of the cache area 12 indicated by the physical memory ID 181 and the physical memory address 182 are managed for each predetermined size. In the example shown in FIG. 5, the predetermined size is represented as "0x1000".

The cache management table 18 is management information which associates a cache ID 180 for identifying the entry, a physical memory ID 181, a physical address 182, a busy flag 183, a use start time 184, a last access time 185, a dirty data flag 186, and a cache hit count 187. The cache ID 180 is the identifier of each entry. The physical memory ID 181 and the physical address 182 indicate that the cache area 12 of the predetermined size is the target storage area of that entry from the physical address 182 in the memory 9 that is identified by the physical memory ID 181.

The busy flag 183 indicates the existence of cache information stored in the target cache area 12 of that entry. The use start time 184 indicates the time that the current cache information was stored in the cache area 12. The last access time 185 indicates the time that the host computer 1 last accessed the cache area 12 of that entry. While the use start time 184 and the last access time 185 are indicated in the form of hours, minutes and seconds, they may also be indicated in the form of year, month and day.

The dirty data flag 186 indicates whether or not the cache information of that entry is dirty data. When the dirty data flag 186 is ON; that is, when the cache information of that entry is dirty data, this indicates that the cache information is the latest write data, and old data before the update is stored in the drive 4. When the dirty data flag is OFF; that is, when the cache information of that entry is not dirty data, this indicates that the cache information is the latest data, and the data stored in the drive 4 is also the latest data.

The cache hit count 187 is the frequency that the data pertaining to the read requests from the host computer 1 existed in the cache area 12 within a predetermined unit time. The cache hit count 187 may also be measured with a counter equipped in each storage apparatus 2. The cache hit count 187 within a predetermined unit time may also be calculated from the counter's frequency and the counter's measurement time.

In this embodiment, the access frequency is explained as the cache hit count 187 within a predetermined unit time. Moreover, in this embodiment, the access frequency being low is explained as the cache hit count 187 within a predetermined unit time being small. The comparative target is another storage apparatus 2 or another memory 9 of the host storage apparatus 2. However, the access frequency is not limited to this example. For instance, the access frequency may also be the last access time 185. In the foregoing case, the access frequency being low means that the last access time 185 is old.

FIG. 6 is a diagram showing a configuration of the logical volume management table 26. The logical volume management table 26 is management information which associates a logical volume ID 260 for identifying each logical volume 10, a cache guarantee 261, a logical volume address 262, a cache ID(A) 263, a cache ID(B) 264, a drive ID 265, and a drive address 266.

The storage apparatus 2 manages the storage areas of the logical volume indicated by the logical volume ID 260 and the logical volume address 262 for each predetermined size. In the example shown in FIG. 6, the predetermined size is represented as "0x1000". The logical volume ID 260 is the identifier of the logical volume 10. The cache guarantee 261 indicates the cache guarantee that is set in the logical volume 10. The logical volume address 262 indicates the address in the logical volume 10.

The cache ID(A) 263 and the cache ID(B) 264 are the cache areas 12 corresponding to the logical volume address 262. When both the cache ID(A) 263 and the cache ID(B) 264 are set, this indicates that write data is stored in these cache areas 12. The cache ID(B) 263 indicates the cache area 12 of the duplication destination of the write data, and is not set in the case of a read data. Moreover, when neither the cache ID(A) 263 nor the cache ID(B) 264 are set, this indicates that no data is stored in the cache area 12.

The drive ID 265 is the identifier for identifying the drive 4. The drive address 266 is a physical address in the drive 4, and indicates the physical storage area in the drive 4 storing the data designated by the logical volume ID 260 and the address 262.

The data access processing to be executed by the storage apparatus 2 when the host computer 1 performs data access to the storage apparatus 2 is now explained. The storage apparatus 2 receives, from the host computer 1, a data access request designating the ID and address of the logical volume 10. The storage apparatus 2 identifies the address of the cache and the address of the drive 4 associated with the designated address of the logical volume 10. Specifically, the storage apparatus 2 refers to the logical volume management table 26, and acquires the cache ID(A) 263 and the cache ID(B) 264, and the drive ID 265 and the drive address 266, which are associated with the logical volume ID 260 and the logical volume address 262 designated in the data access request. The acquired cache ID(A) 263 and cache ID(B) 264 respectively correspond to the cache ID 180 in the cache management table 18.

Here, as the probability that the data pertaining to the read requests from the host computer 1 existing in the cache area 12 (this is hereinafter referred to as the "cache hit ratio") is higher, the response to the read request will be of higher performance. However, because the cache area 12 is a shared resource among a plurality of logical volumes 10, when the busy flag 183 is ON (busy) regarding the entries of all cache IDs 180, the cache information of an arbitrary entry is deleted, and new cache information is stored therein. Consequently, due to a data access to a certain logical volume 10, the cache hit ratio of another logical volume 10 may deteriorate. Because the user may use a different logical volume 10 for each service, there are demands for suppressing the interference of performance between the services.

Thus, the storage apparatus 2 provides a function of guaranteeing the minimum capacity of the cache area 12 that is usable for each logical volume 10. For example, as shown in FIG. 6, the cache guarantee 261 set by the user is stored for each logical volume 10, and, upon selecting the cache information to be deleted, whether or not the cache guarantee 261 can be satisfied even after the deletion is evaluated. The cache information is deleted when the cache guarantee 261 can be satisfied, and other cache information is deleted when the cache guarantee 261 cannot be satisfied.

FIG. 7 is a diagram showing a configuration of the logical/physical conversion table 35. The logical/physical conversion table 35 is management information which associates a logical memory ID 350 and a logical address 351 as the storage destination of the data recognized by the various programs, a storage ID 352 for identifying the storage apparatus 2 as the storage destination that is actually storing the indicated data, and a physical memory ID 353 and a physical address 354 in the storage apparatus 2. The processor 8 of each storage apparatus 2 performs the conversion of the logical memory ID 350 and the logical address 351 into the storage ID 352, the physical memory ID 353 and the physical address 354, or the reverse conversion thereof, by using the logical/physical conversion table 35.

In S102 and S103 described above, explained was the processing of the copy destination storage apparatus 2 releasing at least a part of the cache area 12 of the memory 9 of the copy destination storage apparatus 2 and storing the copy target management information in the released cache area 12. This processing is now explained in further detail. The copy destination storage apparatus 2 sets "None" in the cache ID(A) 263 and the cache ID(B) 264 of the cache area 12 storing the cache information to be deleted in the logical volume management table 26, and then disuses the cache area 12. Furthermore, the copy destination storage apparatus 2 refers to the cache management table 18, and stores the area indicated by the physical memory ID 181 and the physical address 182 as the copy destination of the management information regarding the cache ID 180 to be deleted, and then deletes that entry.

Subsequently, the copy destination storage apparatus 2 copies the management information to the copy destination of the management information stored in the step of S11. Specifically, the storage apparatus 2 refers to the management information arrangement table 13, and searches for an entry of a memory ID in which the value of the logical memory ID(A) 131 or the logical memory ID(B) 133 will become unusable. The storage apparatus 2 uses the accessible memory address of that entry to read the management information, and write the management in the copy destination of the management information recorded in the step of S11. The storage apparatus 2 thereafter overwrites the memory ID and memory address of the copy destination on the logical memory ID and the logical memory address of that entry that will become unusable.

The removal processing (FIG. 8) and the failure processing (FIG. 9) of the storage apparatus 2 are now explained. The foregoing processing is performed by the storage apparatus 2, and any storage apparatus 2 of the storage system may perform these processing. However, desirably, a storage apparatus 2 other than the storage apparatus 2 that was subject to a failure performs the foregoing processing. For example, a storage apparatus 2 storing a copy of the management information stored in the storage apparatus 2 to be removed or the storage apparatus 2 subject to a failure may perform these processing. Moreover, when there is a management which is connected to each storage apparatus 2 and which manages the storage system, the management computer may execute these processing in coordination with the respective storage apparatuses 2.

Moreover, the trigger for commencing the removal processing or the failure processing may be the time that the storage apparatus 2 to execute the processing receives a removal notification or a failure notification from the storage apparatus 2 to be removed or the storage apparatus 2 subject to a failure, or the time that the user instructs the execution of the removal processing or the failure processing from the management terminal. Moreover, the failure processing may also be executed when a storage apparatus 2 that is communicating with the respective storage apparatuses 2 detects a failure of another storage apparatus 2.

Figure 8:
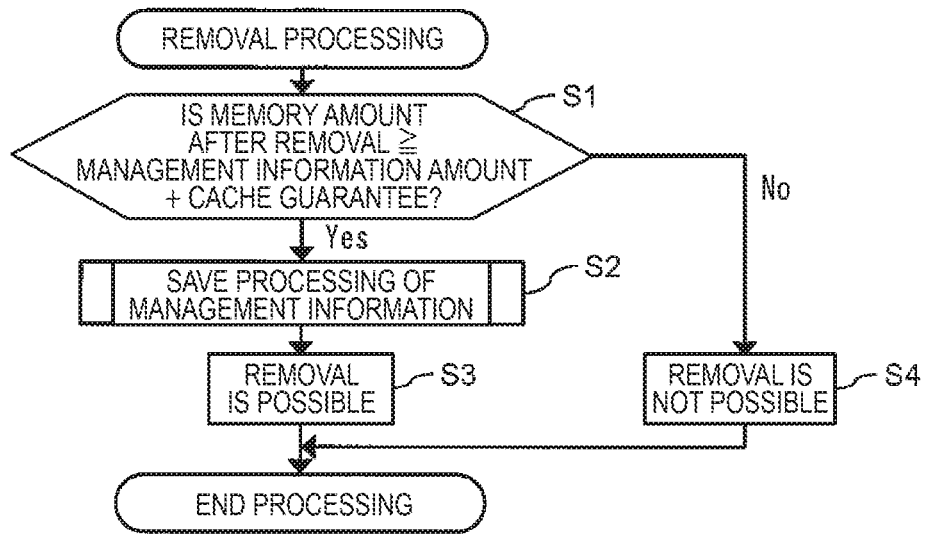
FIG. 8 is a flowchart showing the removal processing of the storage apparatus.

FIG. 8 is a flowchart showing the removal processing of the storage apparatus 2. The processing of removing one or more storage apparatuses 2 among the plurality of storage apparatuses 2 is now explained.

The storage apparatus 2 calculates the total of the capacity of the management information (this is hereinafter referred to as the "management information amount") and the cache guarantee in each storage apparatus 2, and the total memory amount after the removal of the storage apparatuses 2 (this is hereinafter referred to as the "memory amount after removal"). The storage apparatus 2 evaluates whether or not the memory amount after removal is greater than the total of the management information amount and the cache guarantee (this is hereinafter referred to as the "required memory amount") (S1). Here, the storage apparatus 2 may also calculate the required memory amount and the memory amount after removal based on the management information arrangement table 13, the cache management table 18 and the logical volume management table 26 of each storage apparatus 2. Otherwise, the storage apparatus 2 may request each storage apparatus 2 to return the memory amount, the management information amount and the cache guarantee, and calculate the required memory amount and the memory amount after removal based on the memory amount, the management information amount and the cache guarantee returned from each storage apparatus 2.

When the memory amount after removal is greater than the required memory amount, the save processing of saving the management information stored in the memory 9 of the storage apparatus 2 to be removed to the memory 9 of another storage apparatus 2 is executed (S2). This management information save processing (S2) has been previously explained with reference to FIG. 1. Subsequently, information indicating that the storage apparatus 2 may be removed may also be displayed on the user's management terminal (S3). The user can remove the storage apparatus 2 upon confirming the displayed message.

In the evaluation of S1, when the memory amount after removal is not greater than the required memory amount, a message to the effect that the storage apparatus 2 may not be removed because, if removed, necessary information cannot be stored in the memory of the remaining storage apparatuses 2, may also be displayed on the user's management terminal (S4). Here, the storage apparatus 2 may also display to the user, for example, information indicating the level of insufficiency of the memory amount after the removal. By referring to the displayed message, the user may review the cache guarantee 28 and reduce the required memory amount, and then cause the storage apparatus 2 to once again execute the removal processing.

Figure 9:
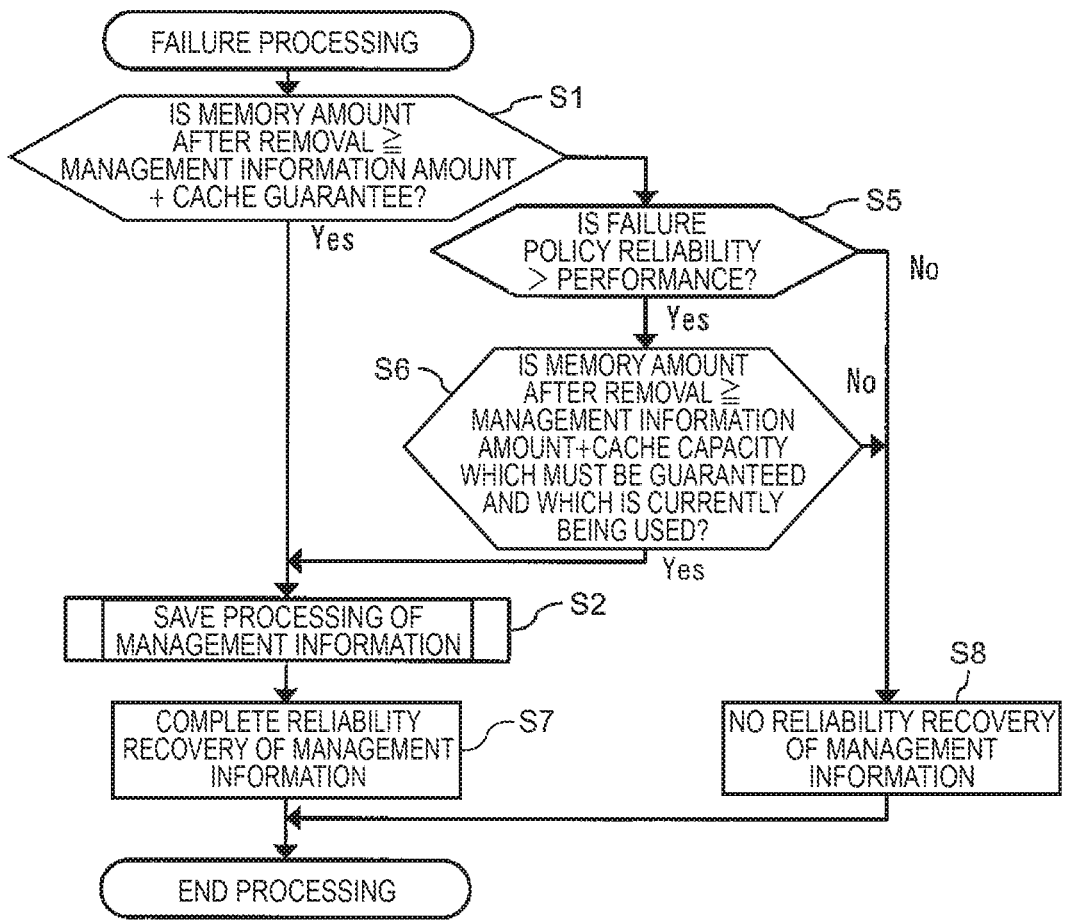
FIG. 9 is a flowchart showing the failure processing of the storage apparatus.

FIG. 9 is a flowchart showing the failure processing of the storage apparatus 2. The processing to be performed when one or more storage apparatuses 2 among the plurality of storage apparatuses 2 is subject to a failure is now explained.

When the storage apparatus 2 detects a failure in another storage apparatus 2, the storage apparatus 2 executes the same processing as the step of S1 in FIG. 8. When the memory amount after removal is greater than the required memory amount in the evaluation of S1, the management information save processing of S2 is executed.

When the memory amount after removal is not greater than the required memory amount in the evaluation of S1, the storage apparatus 2 refers to the failure policy (S5). A "failure policy" is information which prescribes whether to give preference to reliability or performance when it is not possible to support both the duplication of management information and the cache guarantee, and is set by the user.

When the policy gives preference to performance (S5: No), the single status of the management information is maintained, and the reliability is not restored (S8). In step S8, for example, the storage apparatus 2 may also display a message on the user's management terminal to the effect that the reliability cannot be restored due to an insufficient memory amount. Moreover, the storage apparatus 2 may also display information on the user's management terminal for urging the user to review the cache guarantee or promptly replace the defective parts.

When the policy gives preference to reliability in S5 (S5: Yes), the required memory amount is recalculated by deeming only the cache amount that is actually being used among the cache guarantee as the required memory amount (S6). Specifically, the existence of the cache ID(A) 263 and the cache ID(B) 264 is tabulated for each logical volume ID 260 of the logical volume management table 26, and the busy cache amount is thereby calculated. The calculated busy cache amount and the cache guarantee 261 are compared, and the smaller value is set as the memory amount to be guaranteed by the logical volume 10. The total of double the size 135 of the management information arrangement table 13 and the memory amount to be guaranteed by each logical volume 10 is set as the required memory amount, and then compared with the memory amount after removal.

When the memory amount after removal is greater than the recalculated required memory amount (S6: Yes), the management information save processing of S2 is executed. When the memory amount after removal is not greater than the recalculated required memory amount (S6: No), the step of S8 is executed.

It is thereby possible to satisfy the user's request of giving preference to the reliability of the service than the performance of the service. Moreover, because the cache amount to be used will not increase unless the data access pattern of the host computer 1 is changed, it is possible to maintain the reliability without deteriorating the performance.

After executing the step of S2, the restoration of the reliability of the management information is completed (S7). In the step of S7, for example, the storage apparatus 2 may also display information on the user's management terminal indicating the occurrence of a failure and the restoration of the reliability. Moreover, the storage apparatus 2 may also display information on the user's management terminal to the effect that the storage apparatuses 2 that were not subject to a failure may continued to be operated as is. Moreover, the storage apparatus 2 may also display information on the user's management terminal for urging the user to replace the defective parts.

Figure 10:
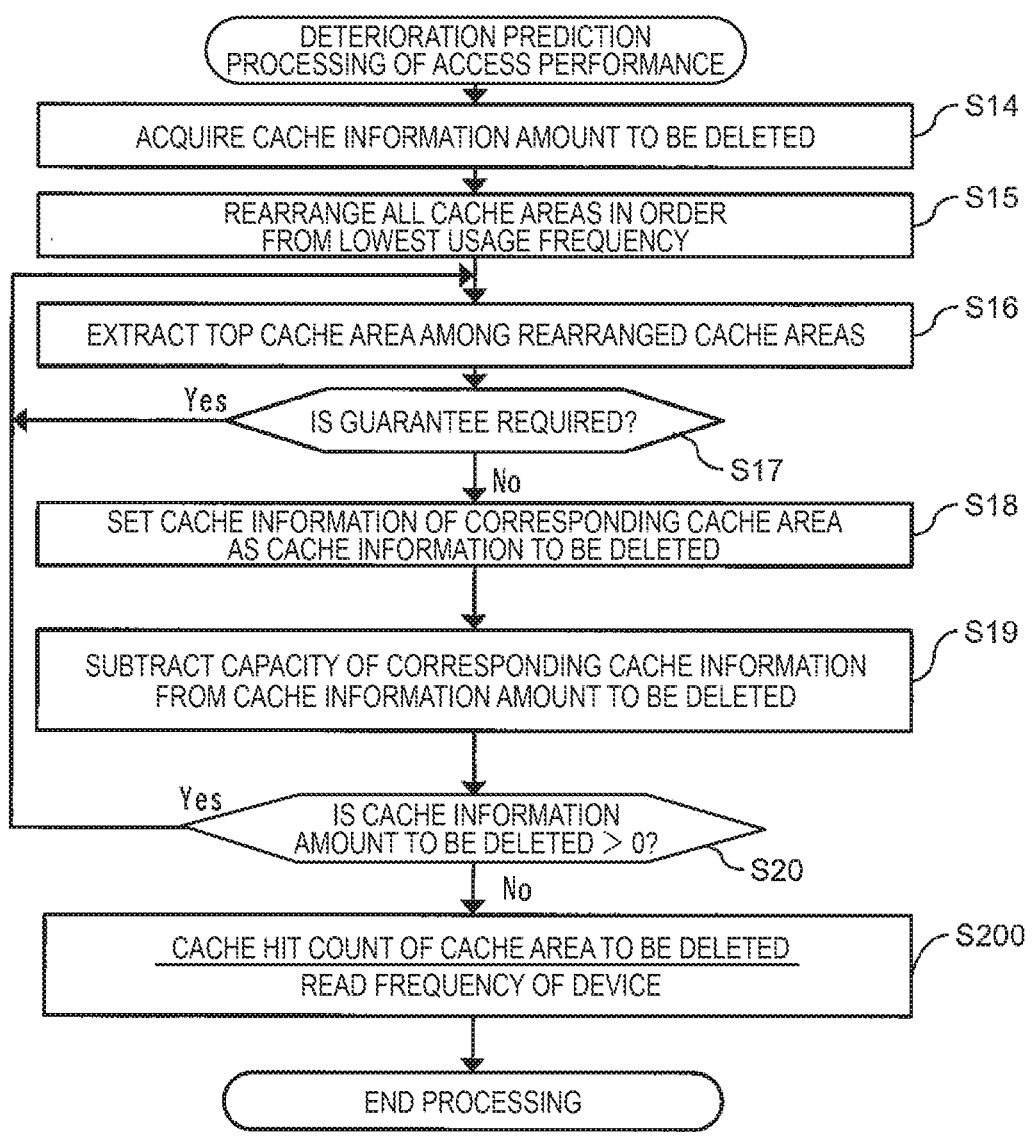
FIG. 10 is a flowchart showing the deterioration prediction processing of access performance.

FIG. 10 is a flowchart of the access performance deterioration prediction processing. In the ensuing explanation, an example of a case where the deterioration in the access performance is the deterioration in the cache hit ratio is described. This processing is executed by each of the copy destination candidate storage apparatuses. Thus, the copy destination storage apparatus and the cache area 12 to be released can be determined based on the usage status of the cache area 12 of the memory 9 of each of the copy destination candidate storage apparatuses that the deterioration in the cache hit ratio can be suppressed.

Foremost, the copy destination candidate storage apparatus 2 acquires the capacity of the copy target management information (S14). As explained in the example of FIG. 1, the processing may also be executed by the storage apparatus A notifying the capacity of the copy target management information (shared management information X) to each of the copy destination candidate storage apparatuses C, D. Otherwise, the copy destination candidate storage apparatus refers to the management information arrangement table 13, and searches for an entry with a memory ID in which the value of the logical memory 1D(A) 131 or the logical memory ID(B) 133 will become unusable. The total value of the size 135 of the entry may also be the capacity of the copy target management information. The capacity of the copy target management information is set to be the "cache information amount to be deleted" at such point in time.

Subsequently, the copy destination candidate storage apparatus 2 uses the cache management table 18, which is individual management information, and rearranges the cache areas 12 of all of its memories 9 in order from the cache area 12 with the lowest usage frequency (S15). The objective of this process is to rearrange the cache information in the order that is unlikely to deteriorate the cache hit ratio, and, for example, the cache information is rearranged in the order of last access time 185 of the cache management table 18. Otherwise, when the last access time 185 is the same, a method of rearranging the cache information by giving preference to the oldest use start time 184 or a method of rearranging the cache information by giving preference to the lowest cache hit count 187 may also be adopted, and this method is not limited to the method described in the step of S15 so as long as the past usage status of the cache is used.

The copy destination candidate storage apparatus 2 identifies the cache areas 12 in order from the cache area 12 with the lowest usage frequency as rearranged in the step of S15 (S16), and evaluates whether or not it is necessary to secure the corresponding cache area 12 (S17). Specifically, the copy destination candidate storage apparatus 2 refers to the cache management table 18, identifies the entry that matches the extracted cache area 12, and identifies the entry of the logical volume management table 26 having the corresponding entry ID 180. The copy destination candidate storage apparatus 2 compares the amount of assignment of the cache area 12, which is indicated by the cache ID(A) 263 and the cache ID(B) 264, and the cache guarantee 261, in the identified entry. When the amount of assignment of the cache area 12 of the logical volume 10 will not fall below the cache guarantee even when the cache area 12 is released (S17: No), the copy destination candidate storage apparatus 2 evaluates that no guarantee is required, and executes the step of S18. Meanwhile, when the amount of assignment of the cache area 12 of the logical volume 10 will fall below the cache guarantee even when the cache area 12 when the cache area 12 is released (S17: Yes), the copy destination candidate storage apparatus 2 determines that guarantee is required, and executes the step of S16.

After evaluating that guarantee is required in the step of S17, the copy destination candidate storage apparatus 2 sets the corresponding cache area 12 as the cache area 12 to be deleted (S18), subtracts the size of the corresponding cache area 12 from the "cache information amount to be deleted", and updates the "cache information amount to be deleted" (S19). When the updated "cache information amount to be deleted" is greater than 0, the copy destination candidate storage apparatus 2 evaluates that the deletion of further cache information is required, and executes the step of S16 (S20: Yes).

When the updated "cache information amount to be deleted" is 0 or less (S20: No), the copy destination candidate storage apparatus 2 refers to the cache management table 18, and calculates the predictive value of the deterioration in the access performance by diving the total cache hit count 187 per predetermined unit time in the cache area 12 to be deleted by the read frequency, or number of read requests, that the storage apparatus received per predetermined unit time (S200). However, the predictive value of the deterioration in the access performance may also be calculated based on other methods, and it is not limited to the method described in S200.

Figure 11:
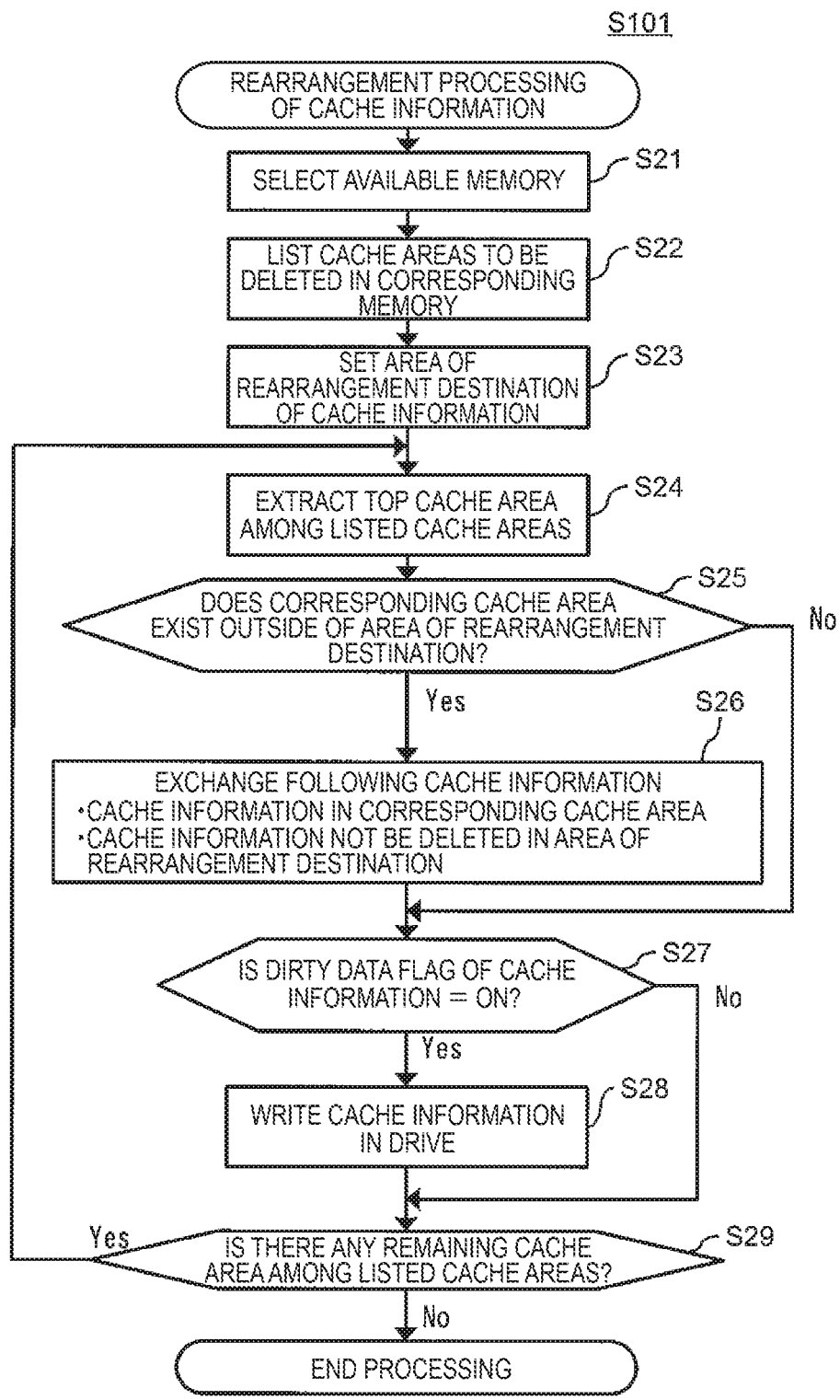
FIG. 11 is a flowchart showing the rearrangement processing of cache information.

FIG. 11 is a flowchart of the cache information rearrangement processing. This processing is executed by the copy destination storage apparatus. Based on this processing, it is possible to secure a continuous memory area required for storing the copy target management information, and suppress the deterioration in the access performance after the release of the cache area 12.

While the ensuing explanation describes the processing of rearranging the cache areas 12 to be deleted in one location for the sake of simplification, rearrangement is not limited to one location. Moreover, if it is possible to manage the copy target management information by dividing it into a plurality of memory areas, the cache areas 12 may be rearranged in a plurality of memory areas, or, if it is possible to dispose the copy target management information in a continuous memory area of the cache area 12, then the rearrangement itself may be omitted. However, as the copy target management information is managed by being divided into a plurality of smaller memory areas, the memory consumption required for storing the segmentalized management information in the storage destination memory will increase. For example, the entries of the management information arrangement table 13 will increase. Thus, the usage efficiency of the memory 9 can be improved by storing the management information in a relatively large continuous area.

Foremost, the copy destination storage apparatus 2 selects an available memory 9 (S21), and lists the cache areas 12 to be deleted (S22).

Subsequently, the copy destination storage apparatus 2 sets a highly dense area of the cache areas 12 to be deleted in the cache area 12 of the rearrangement destination (S23). The objective of this process is to reduce the number of pieces of cache information to be rearranged.

The copy destination storage apparatus 2 extracts the top cache area 12 among the listed cache areas 12 (S24), and evaluates whether that cache area 12 exists outside the memory area of the rearrangement destination (S25). When that cache area 12 exists outside the memory area of the rearrangement destination (S25: Yes), the copy destination storage apparatus 2 exchanges the data of the cache information, which is not a deletion target and which exists within the area, and the data of the extracted cache information (S26). Specifically, the copy destination storage apparatus 2 mutually moves the cache information of the areas indicated by the physical address 182 between the entries of the cache management table 18, and thereafter also mutually moves the physical address 182, the use start time 184, the last access time 185, the dirty data flag 186, and the access hit count 187 between the entries. Note that, because this processing is the rearrangement of the cache information and not a data access to the cache area 12, the use start time 184 and the last access time 185 are not changed.

When it is evaluated that the cache information is within the memory area of the rearrangement destination in the step of S25 (S25: No), or upon executing the step of S26, the copy destination storage apparatus 2 refers to the cache management table 18, and refers to the dirty data flag 186 of the entry corresponding to the cache area 12 extracted in the step of S24 (S27).

When the dirty data flag 186 is ON (S27: Yes), because this means that the data of the drive 4 is old data and the cache information of the cache area 12 is the latest data, the copy destination storage apparatus 2 stores the cache information in the drive 4 before deleting the cache information (S28). Specifically, the copy destination storage apparatus 2 refers to the logical volume management table 26, and identifies the entry in which the value of the cache ID(A) 263 and (B) 264 coincides with the cache ID 180. The cache information is stored in the area indicated by the drive ID 265 and the drive address 266 of the identified entry. The dirty data flag 186 is thereafter set to OFF. It is thereby possible to delete the cache information of the cache area 12.

When the dirty data flag 186 is OFF (S27: No), because this means that the data of the drive 4 is the latest data, the copy destination storage apparatus 2 can delete the cache information of the cache area 12.

Subsequently, the copy destination storage apparatus 2 confirms whether or not there is any remaining cache area 12 among the listed cache areas 12 (S29). If there is a remaining cache area 12 (S29: Yes), the copy destination storage apparatus 2 executes the step of S24. If there is no remaining cache area 12 (S29: No), the copy destination storage apparatus 2 ends the processing.

Note that, in this embodiment, in the cache information rearrangement processing, the processing was explained in the order of replacing the cache information inside/outside the memory area of the rearrangement destination (S26), storing the cache information to become the latest data in the drive (S28), and deleting the cache information (S102). Nevertheless, when the step of S28 and the step of S102 are executed first, because the cache information, which is within the memory area of the rearrangement destination and which is not to be deleted, only needs to be moved to an unused area outside the area in the step of S26, the data copy frequency can be reduced in comparison to the case of replacing the cache information. The order of processing is not limited to the order described above so as long as the cache area 12 to be deleted is selected so that the cache hit ratio will not deteriorate, and the copy target management information is duplicated in the deleted area.

By executing the access performance deterioration prediction processing explained with reference to FIG. 10 and the cache information rearrangement processing explained with reference to FIG. 11, the copy destination storage apparatus 2 executes the following processing. The processor 8 of the copy destination storage apparatus 2 uses the cache management table 18 and divides the cache area 12 of the memory 9 of the copy destination storage apparatus into a plurality of small areas, and manages the access frequency of each of the small areas. Here, the term "small area" refers to the cache area 12 that is managed in each entry of the cache ID 180 of the cache management table. The copy destination storage apparatus 2 releases at least a part of the cache area 12 by disusing the cache information stored in a small area with a low access frequency based on the access frequency of each small area. Here, the processor 8 of the copy destination storage apparatus 2 uses the logical volume management table 26 to manage the cache guarantee 261 set in the logical volume 10, and disuses the cache information stored in a small area o the cache area 12 with a low access frequency when the cache guarantee is satisfied even when such small area is released. It is thereby possible to suppress the deterioration in the access performance of the copy destination storage apparatus after the cache area 12 is released.

Moreover, in the processing of determining the copy destination storage apparatus (S100), by refraining from using a storage apparatus 2 which was subject to a memory failure in the past as the copy destination storage apparatus, it may be possible to omit the management information save processing in a future failure. For example, when the number of storage apparatuses 2 is gradually increased in accordance with the growth of the service, the storage apparatus will comprise both new and old memories 9. Here, if a failure occurs in a certain memory 9 of a relatively old storage apparatus 2 which was purchased initially, even if the cache area 12 of another memory 9 of that storage apparatus 2 is released and the management information is copied therein, because this memory 9 is also relatively old as with the malfunctioned memory 9, it is likely that a failure will occur. Thus, it is also possible to preferentially release the cache area 12 of the memory 9 of another relatively new storage apparatus 2 and copy the management information therein.

In the management information copy processing of S103, as described above, the copy destination storage apparatus stores the copy target management information in the released cache area 12. Here, the logical memory ID 131 and the logical address 132 of the management information arrangement table 13 may be changed. Nevertheless, when the various programs to be executed by the storage apparatus 2 are statically storing the logical memory ID 131 and the logical address 132 as the storage destination of the shared management information, or the values previously read from the management information arrangement table 13 during the initial startup of the programs are being reused, the copy target management information cannot be accessed if the storage destination of the copy target management information is changed in the step of S103.

Thus, in this embodiment, if the storage destination of the copy target management information is changed in the step of S103, the logical/physical conversion table 35 is updated without changing the logical memory ID 131 and the logical address 132 of the management information arrangement table 13. Specifically, the copy destination storage apparatus 2 uses the configuration information arrangement table 13 and the logical/physical conversion table 35 and identifies the logical memory ID 131 and the logical address 132 of the memory 9 storing the copy target management information in the storage apparatus 2 subject to a failure or the storage apparatus 2 to be removed. The copy destination storage apparatus 2 updates the entries of the identified logical memory ID 131 and logical address 132 in the logical/physical conversion table 35 by using the physical memory ID 353 and the physical address 354 of its own memory 9 which is its own storage ID 352 and storage destination of the copy target management information.

Moreover, because the logical/physical conversion table 35 is integrated management information respectively provided in all of the storage apparatuses 2, the logical/physical conversion table 35 of each storage apparatus 2 is updated. For example, the copy destination storage apparatus 2 updates the logical/physical conversion table 35 of each storage apparatus 2 by notifying the storage destination of the copy target management information (storage ID 352, physical memory ID 353, physical address 354) to at least some or all of the plurality of storage apparatuses 2. For example, the notified storage apparatus 2 notifies the storage destination of the copy target management information to the storage apparatus 2 to be disused and the storage apparatuses 2 other than the notified storage apparatus 2. Each of the notified storage apparatuses 2 updates the logical/physical conversion table 35.

Figure 12:
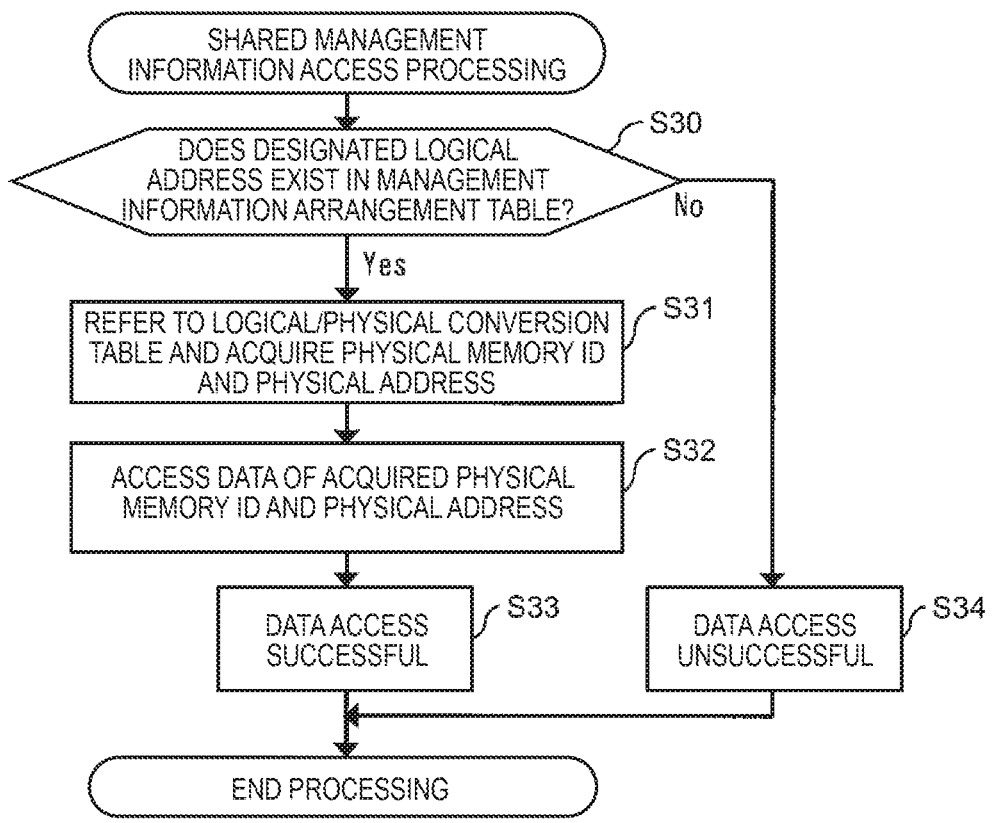
FIG. 12 is a flowchart showing the shared management information access processing.

FIG. 12 is a flowchart showing the access processing of accessing the shared management information using the logical/physical conversion table 35. This processing is executed by each storage apparatus 2. For example, when the program executed by the processor 8 of the storage apparatus 2 designates a logical memory ID and a logical address and attempts to access the shared management information, the following access processing for accessing the shared management information is executed.

Foremost, the storage apparatus 2 refers to the logical/physical conversion table 35, and searches for an entry which matches the designated logical memory ID and logical address from the management information arrangement table 13 (S30). When there is a matching entry (S30: Yes), the storage apparatus 2 evaluates that the designated logical memory ID 131 and logical address 132 indicate the management information storage area, and executes the step of S31. Meanwhile, when there is no matching entry (S30: No), the storage apparatus 2 determines that it is not the management information storage area, and determines that the data access was unsuccessful (S34).

In the step of S31, the storage apparatus 2 refers to the logical/physical conversion table 35, and searches for an entry having the logical memory ID 350 and the logical address 351 that match the designated logical memory ID and logical address.

Subsequently, the storage apparatus 2 accesses the data in the memory area indicated by the storage ID 352, the physical memory ID 353 and the physical address 354 in the entry searched in the step of S31 (S32), and determines that the data access was successful (S33).

As described above, as a result of providing the logical/physical conversion table 35, the program executed by the processor 8 of the storage apparatus 2 can access the management information by using the same logical memory ID 131 and logical address 132 even when the storage location of the shared management information is changed in S103.

In the foregoing explanation, a method of continuing the duplication of management information in cases where the number of available memories 9 will decrease due to the removal or failure of a storage apparatus 2 was described. Here, when a storage apparatus 2 is added or the number of available memories 9 increases based on failure recovery, the storage apparatus 2 seeks to improve performance by storing the cache information in the added memory 9. However, when the step of S8, which is processing to be performed during a memory failure, is implemented and the status is such that the management information has not been duplicated, the added memory 9 may be selected as the save destination of the management information, and the management information may be duplicated based on the step of S103 to restore the reliability.

Moreover, when the status during the normal times of the management information arrangement table 13 and the logical/physical conversion table 35 of the storage system (status before failure or removal of the storage apparatus) is stored, and one or more storage apparatuses 2 are to be added to the storage system after the failure or removal of the storage apparatus, the status may be restored to the status during normal times. For example, when adding one or more storage apparatuses 2 to the storage system, it is also possible to store the integrated management information and the copy target management information in the memory 9 of the added storage apparatus 2, release the area storing the copy target management information among the memories 9 of the copy destination storage apparatus 2, and store the cache information in the released area.

While the foregoing explanation described the various types of information of the storage system by using expressions such as "table" and the like, the data structure of such information is not limited thereto, and other data structures may also be used. Because each piece of information is not dependent on the data structure, for instance, "kkk table" may also be referred to as "kkk information".

Moreover, in the foregoing explanation, the processor 8 executes programs and performs processing while using storage resources (for instance, memory 9) and/or communication interface devices (for instance, communication port). The processing to be performed by the processor 8 may also be interpreted as being performed by executing one or more programs. Moreover, the processing to be performed by the storage apparatus 2 may also be interpreted as being executed by the processor 8 of the storage apparatus 2. While the processor 8 is typically a microprocessor such as a CPU (Central Processing Unit), it may also include a hardware circuit which executes a part of the processing (for instance, encryption/decryption, compression/decompression).

REFERENCE SIGNS LIST

1 host computer, 2 storage apparatus, 3 network, 4 drive, 5 storage controller, 6 server I/F, 7 drive I/F, 8 processor, 9 memory, 10 logical volume, 11 management information storage area, 12 cache area, 40 inter-device coupling I/F, 41 network

The invention claimed is:

1. A storage system comprising a plurality of storage apparatuses including a first storage apparatus,
wherein each of the plurality of storage apparatuses comprises a memory which includes a management information storage area for storing management information and a cache area for storing cache information, and a processor which manages a status of the cache area,
wherein, when a memory of the first storage apparatus is to be disused, at least certain processors of the plurality of storage apparatuses determine a copy destination storage apparatus to become a copy destination of a copy target management information, the copy target management information is the management information stored in the memory to be disused, the copy destination storage apparatus is based on the status of the cache area that is managed by each processor other than the processor in the first storage apparatus,
wherein the copy destination storage apparatus is one of the plurality of storage apparatuses, and
wherein the processor of the copy destination storage apparatus releases at least a part of the cache area of the memory of the copy destination storage apparatus, and stored the copy target management information in the released at least part of the cache area.

2. The storage system according to claim 1,
wherein the management information is information which is stored in at least one of the memories of the plurality of storage apparatuses and which can be referenced by at least one of the processors of the plurality of storage apparatuses from the memory when the plurality of storage apparatuses are operating,
wherein the cache information is information which can be deleted from any one of the memories of the plurality of storage apparatuses when the information is stored in a storage device equipped in at least one of the plurality of storage apparatuses,
wherein the status of the cache area includes at least information of an access frequency of the cache area, and
wherein the plurality of copy destination candidate storage apparatuses are the plurality of storage apparatuses, the processors of the plurality of copy destination candidate storage apparatuses:
predict a deterioration in access performance when copy target management information is copied to each of the plurality of copy destination candidate storage apparatuses based on the access frequency of the cache area managed by each of the copy destination candidate storage apparatuses; and
determine, as the copy destination storage apparatus, a storage apparatus in which a predicted deterioration in access performance is low among the plurality of copy destination candidate storage apparatuses.

3. The storage system according to claim 2,
wherein the plurality of storage apparatuses comprise at least the first storage apparatus, a second storage apparatus, and the copy destination storage apparatus,
wherein the copy target management information is made redundant by storing the copy target management information in a memory of the first storage apparatus and a memory of the second storage apparatus, respectively,
wherein, when the memory of the first storage apparatus is to be disused, the copy target management information is stored in the copy destination storage apparatus so as to make redundant the copy target management information by using the memory of the second storage apparatus and the memory of the copy destination storage apparatus, and
wherein the copy destination storage apparatus sends a notification of a storage destination of the copy target management information to at least certain storage apparatuses among the plurality of storage apparatuses.

4. The storage system according to claim 3,
wherein the plurality of copy destination candidate storage apparatuses are at least two or more storage apparatuses other than the first storage apparatus and the second storage apparatus,
wherein each of the at least two or more copy destination candidate storage apparatuses predicts a deterioration in the access performance, and sends a predicted deterioration to the second storage apparatus,
wherein the second storage apparatus determines, as a copy destination storage apparatus, a copy destination candidate storage apparatus in which the predicted deterioration in the access performance is low based on the deterioration predicted by each of the at least two or more copy destination candidate storage apparatuses, and wherein the copy destination storage apparatus copies the copy target management information from the second storage apparatus.

5. The storage apparatus according to claim 4, wherein the management information to be stored in the memory of each of the plurality of storage apparatuses includes:

integrated management information provided in each of the plurality of storage apparatuses;

shared management information which can be referenced by other storage apparatuses; and individual management information which is management information that is individually managed by each storage apparatus and which includes information of an access frequency of the cache area of a corresponding storage apparatus, and wherein the copy target management information is the shared management information stored in the memory of the first storage apparatus and the memory of the second storage apparatus, respectively.

6. The storage system according to claim 5, wherein the processor of the copy destination storage apparatus:

divides the cache area of the memory of the copy destination storage apparatus into a plurality of small areas, and manages an access frequency of each of the plurality of small areas; and releases at least a part of the cache area by disusing cache information stored in a small area with a low access frequency based on the access frequency of each of the plurality of small areas.

7. The storage system according to claim 6, wherein the processor of the copy destination storage apparatus rearranges the cache information of the copy destination storage apparatus based on the access frequency of the cache area so that the cache area for storing the copy target management is a continuous area.

8. The storage system according to claim 6, wherein the copy destination storage apparatus further includes one or more storage devices which configure a logical volume to be provided to a host computer, wherein the processor of the copy destination storage apparatus:

manages a cache guarantee which is set in the logical volume; and disuses the cache information stored in a small area of the cache area of the memory of the copy destination storage apparatus when the cache guarantee is satisfied even upon releasing the small area.

9. The storage system according to claim 5, wherein each of the plurality of storage apparatuses includes a plurality of memories, and wherein each storage apparatus makes redundant the individual management information of the corresponding storage apparatus by storing the individual management information in different memories within the corresponding storage apparatus.

10. The storage system according to claim 9, wherein each of the plurality of storage apparatuses comprises a plurality of controllers including a memory, and wherein each storage apparatus makes redundant the individual management information by the corresponding storage apparatus by storing the individual management information in memories of different controllers within the corresponding storage apparatus.

11. The storage system according to claim 5, wherein the memory of the first storage apparatus is disused when the first storage apparatus is subject to a failure or when first storage apparatus is to be removed.

12. The storage system according to claim 5, wherein the management information of each storage apparatus includes at least one of either a program to be executed by one of the processors or information that is used in executing the programs, and wherein the cache information of each storage apparatus includes at least one of either write data based on a write request from a host computer connected to the corresponding storage apparatus or read data to be used in response to a read request from the host computer of the corresponding storage apparatus.

13. The storage system according to claim 5, wherein, when one or more storage apparatuses are to be added to the storage system, the integrated management information and the copy target management information are stored in a memory of the storage apparatus to be added, and wherein an area in which the copy target management information was stored is released within the memory of the copy destination storage apparatus, and the cache information is stored in the released area.

14. A storage apparatus, comprising:

a connection unit that is connected to a plurality of storage apparatuses each comprising a memory which includes a management information storage area storing management information and a cache area storing cache information, and a processor which manages a status of the cache area; and a control unit which determines, when a memory of one storage apparatus among the plurality of storage apparatuses is to be disused, a storage apparatus other than the one storage apparatus in which at least a part of the cache area of the memory of the corresponding storage apparatus is released and management information stored in the memory to be disused is stored therein, the one storage apparatus is based on the status of the cache area that is managed by each of the storage apparatuses other than the one storage apparatus.

15. A control method of a storage system comprising a plurality of storage apparatuses, and a network which connects the plurality of storage apparatuses, wherein the plurality of storage apparatuses comprise at least four or more storage apparatuses including the first storage apparatus and a second storage apparatus, and each of the plurality of storage apparatuses comprises a memory which includes a management information storage area for storing management information and a cache area for storing cache information, and a processor which manages a status of the cache area, wherein the method comprises storing same management information in a memory of the first storage apparatus and a memory of the second storage apparatus, respectively, to make the same management information redundant, when the memory of the first storage apparatus is to be disused, at least two or more storage apparatuses other than the first storage apparatus and the second storage apparatus are copy destination candidate storage apparatuses of the same management information, predicting, by each of the at least two or more copy destination candidate storage apparatuses, based on an access frequency of a cache area area that is managed by a corresponding copy destination candidate storage apparatus, a deterioration in access performance when the same management information is copied to the corresponding copy destination candidate storage apparatus, and sending the predicted deterioration to the second storage apparatus, determining, via the second storage apparatus, as the copy destination storage apparatus, a copy destination candidate storage apparatus in which a predicted deterioration in the access performance is low, releasing, via the copy destination storage apparatus, at least a part of the cache area of the memory of the copy destination storage apparatus, copying the same management information from the second storage apparatus, and storing the same management information in the released at least part of the cache area, and using the memory of the second storage apparatus and the memory of the copy destination storage apparatus to make the same management information redundant.

* * * * *